No. 764,631.

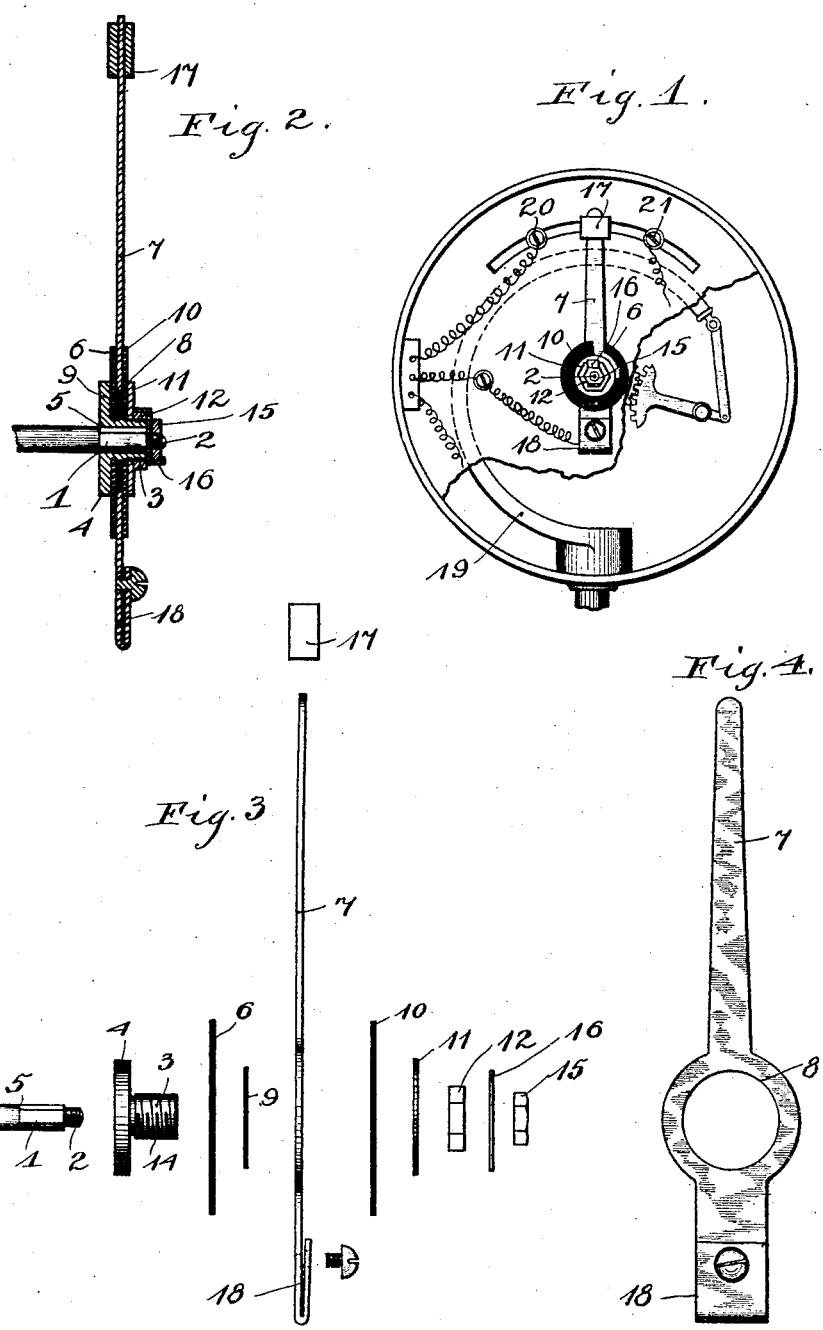

Patented July 12, 1904.

UNITED STATES PATENT OFFICE.

FRANKLIN CROMWELL RANDALL, OF MILWAUKEE, WISCONSIN.

GAGE-HAND.

SPECIFICATION forming part of Letters Patent No. 764,631, dated July 12, 1904.

Application filed February 23, 1904. Serial No. 194,768. (No model.)

*To all whom it may concern:*

Be it known that I, FRANKLIN CROMWELL RANDALL, a citizen of the United States, residing at Milwaukee, in the county of Milwaukee and State of Wisconsin, have invented a certain new and useful Improvement in Gage-Hands, (Case No. 1,) of which the following is a full, clear, concise, and exact description, reference being had to the accompanying drawings, forming a part of this specification.

My invention relates to indicating instruments or gages, and has for its object improved means for more securely mounting or securing the indicating needle or hand to a spindle.

My invention is of great importance when applied to gages which are used in places where more or less vibration thereof is unavoidable—as, for instance, when attached to locomotive-boilers or to pressure-chambers for operating pneumatic brakes, particularly such as those used on electric railways.

Heretofore it has been customary to taper the end of the gage-spindle and to correspondingly ream the pointer or hand, the friction between the two being relied upon to maintain the hand in position on the spindle. However, where the gage is subjected to vibration or jolting the gage-hand when thus applied will work loose. This is particularly true in the street-railway field, where a pneumatic gage connected with an air-reservoir serves to actuate a hand or lever between maximum and minimum contact-points. Here the end of the lever usually rests heavily either against the minimum or the maximum contact, and very little vibration or jolting is necessary to cause loosening of the needle from the spindle when associated as above described.

My invention provides a perfectly rigid connection between a gage-hand and the spindle, and I have shown and described my invention as applied to a pneumatically-controlled gage hand or lever.

By reference to the accompanying drawings my invention will be more clearly understood.

Figure 1 is a front view of a gage or pneumatic lever. Fig. 2 is a detached and longitudinal sectional view of the lever and supporting parts mounted upon the spindle. Fig. 3 is a disassembled view of the lever and its supporting parts, and Fig. 4 is a face view of the lever.

The spindle is provided with a polygonal end 1, which, for convenience, may be hexagonal and a reduced threaded stud 2 extends from this hexagonal end. A sleeve 3 has a hexagonal bore corresponding with the end 1, and a flange 4, which may be integral with the sleeve 3, rests against the shoulder 5 on the spindle when the sleeve is in place thereon. A washer 6, of insulating material, encircles the sleeve 3 and is disposed against the inner side of the flange 4. The lever 7 is provided with a bearing 8, in which bearing an insulated disk 9 is adapted to fit, said disk also passing over the collar 3. An additional washer 10, of insulated material, passes over the sleeve 3 and is disposed before the lever 7 when mounted on the spindle. A clamping-washer 11, also engaging the sleeve 3, is disposed before the washer 10, and a nut 12 engages the threads 14 of the sleeve 3 to firmly clamp the lever and insulating members between the clamping-disk 11 and the flange 4. The nut 15 by engaging the threaded stud 2 firmly holds the supporting-sleeve 3 and flange 4 against the shoulder 5 of the spindle, and to lock the nuts 12 and 15 against loosening I provide a locking member 16, which is normally straight and passes over the stud 2. After application of the nut 15 the ends of this locking-bar are bent over to lie against a face of the nut 12 and also at its other end over a face of the nut 15, thus locking the nuts in position after the lever and supporting-sleeve have been securely clamped in position. The lever at one end may be provided with a contact-button 17, and the other end thereof may be provided with a spring-clamping terminal 18. As the pressure in the circular tube 19 varies, the lever carres the contact-button into engagement with the contact-points 20 and 21 to establish circuits for controlling the pneumatic machinery.

I thus provide improved means for securing a needle or lever to a spindle, which at all times guards against loosening of the needle due to jolting, vibration, or other disturbances, the lever being also entirely insulated from the other parts of the gage and readily removed and applied.

I claim as new and desire to secure by Letters Patent—

1. The combination with a spindle having a polygonal end, of a supporting member for engaging said end, means for securing a lever to said supporting member and means for entirely insulating said lever from the other parts.

2. The combination with a spindle having a polygonal end, of a supporting member for engaging said end, a flange on said supporting member, means for clamping a lever about said supporting member and against said flange, and means for entirely insulating said lever from the other parts.

3. The combination with a spindle provided with a polygonal end, of a threaded sleeve provided with a bore to fit said end, a flange on said sleeve, a nut for engaging the threads on said sleeve, a lever clamped over said sleeve between said flange and said nut, and means for entirely insulating said needle from the remaining parts.

4. The combination with a spindle having a polygonal end, of a threaded stud extending from said end, a threaded sleeve having a polygonal bore to fit said end, a flange on said sleeve, a nut for engaging said threaded sleeve, a lever clamped between said flange and said nut, and a nut engaging said threaded stud for holding said sleeve on said spindle.

5. The combination with a spindle having a polygonal end, of a threaded stud extending from said end, a threaded sleeve having a bore to fit said end, a flange extending from the inner end of said sleeve, a clamping-washer for said sleeve, a nut for engaging said sleeve, a lever clamped by said nut between said flange and said clamping-washer, and a nut for engaging said threaded stud, whereby said sleeve may be secured to said spindle.

6. The combination with a spindle having a polygonal end, of a threaded stud extending from said end, a threaded sleeve having a bore for engaging said end, a flange extending from the inner end of said sleeve, a clamping-washer for said sleeve, a nut for engaging the outer end of said sleeve, a lever clamped by said nut between said flange and said clamping-washer, and a nut for engaging said threaded stud, whereby the sleeve may be clamped in engagement with the spindle, said lever being entirely insulated from the remaining parts.

7. The combination with a cylindrical spindle having a polygonal end, of a threaded stud extending from said end, a threaded sleeve having a bore for engaging said end, a flange extending from the inner end of said sleeve, a clamping-washer for said sleeve, a nut for engaging said sleeve, a lever clamped by said nut between said flange and said clamping-washer, a nut engaging said threaded stud, whereby said sleeve may be securely clamped against the shoulder by virtue of said polygonal end, and locking means for holding both said nuts in position.

8. The combination with a spindle having a polygonal end, of a threaded stud extending from the front end thereof, a threaded sleeve having a bore to fit said end, a flange extending from the inner end of said sleeve, a clamping-washer for said sleeve, a nut for engaging the outer end of said sleeve, a lever clamped by said nut between said flange and said clamping-washer, means for insulating said lever from the remaining parts, a nut engaging said threaded stud, whereby said sleeve may be clamped to said spindle, and a normally straight locking-bar adapted to be clamped between said nuts, and serving, when the ends thereof are turned over said nuts, to firmly lock said nuts in position, In witness whereof I hereunto subscribe my name this 19th day of February, A. D. 1904.

FRANKLIN CROMWELL RANDALL.

Witnesses:
JAMES S. NORRIS,
J. F. DIXON, Jr.